UNITED STATES PATENT OFFICE.

ERNST ERDMANN, OF HALLE-ON-THE-SAALE, GERMANY, ASSIGNOR TO ACTIEN GESELLSCHAFT FUR ANILIN FABRIKATION, OF BERLIN, GERMANY.

HAIR-DYE.

No. 923,635.      Specification of Letters Patent.      Patented June 1, 1909.

Application filed February 10, 1906. Serial No. 300,514.

*To all whom it may concern:*

Be it known that I, ERNST ERDMANN, of Halle-on-the-Saale, in the Kingdom of Prussia, German Empire, have invented new and useful Improvements in Hair-Dye; and I do hereby declare that the following is a full, clear, and exact description thereof, which will enable others skilled in the art to which it appertains to make and use the same.

I have found that by means of a certain class of amino-sulfonic acids of the benzene-series of the general formula:

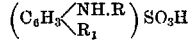

preparations may be obtained which produce on hairs very fine shades of natural appearance and of a very good fastness; it is a particularly surprising fact that the shades obtained in this way are "fast to water" as it is called, this being nearly the most important property in addition to a natural appearance. Moreover the preparations I produce are in no way poisonous, nor do they irritate the skin.

In the above-given formula:

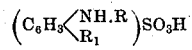

R means a hydrogen-atom or the organic radical; phenyl or tolyl or the like while $R_1$ stands for the group $NH_2$ or $OH$; the sulfonic group may have entered the benzene-nucleus shown in the above formula or a benzene-nucleus which in the above formula is represented by the letter R. So for instance the above formula comprises the following amino-sulfonic acids: ortho- or para-aminophenol-sulfonic acid, an amino-diphenyl-amin-sulfonic acid, a phenylenediamin-sulfonic acid, a toluylenediamin-sulfonic acid or the homologues or derivatives of such a sulfonic acid. Furthermore I have found that it is possible for the practical use of my preparations to mix two or more of the amino-sulfonic acids of the above-defined class; in this way shades of any kind and also of natural appearance may be produced.

Now my present preparations for dyeing hairs preferably contain some other ingredients besides the above amino-sulfonic acids. First a certain proportion of an alkali, such as sodium carbonate, ammonium carbonate or the like, is to be added, preferably such that an alkaline solution is obtained when my preparations are dissolved in water, which solvent is the most convenient and cheapest for the practical use of my preparations. Furthermore it is advantageous to mix such a preparation with a small proportion of a bisulfite, the object of which is to prevent oxidation before using the preparations; obviously any other suitable agent which prevents or retards oxidation will also serve.

The following examples may serve to illustrate my invention, the parts being by weight:

Example 1: Prepare a solution by mixing 100 parts of water, 4 parts of ortho-aminophenolsulfonic acid ($OH:NH_2:SO_3H = 1:2:4$) and 1.6 parts of calcined sodium carbonate, thus obtaining a solution of sodium ortho-aminophenolsulfonate. This preparation when applied to the hair in presence of an oxidizing agent produces a yellowish blond to blond shade.

Example 2: Prepare a solution containing 4 parts of ortho-aminophenol-sulfonic acid ($OH:NH_2:SO_3H = 1:2:4$) and 2 parts of calcined sodium carbonate in 100 parts of water; this preparation applied to the hair in presence of an oxidizing agent produces a yellowish blond shade.

Example 3: Prepare a solution from 3 parts of para-aminodiphenylamin-sulfonic acid obtained by the action of sodium bisulfite on para-nitrosodiphenylamin, 3 parts of ortho-aminophenol-sulfonic acid ($OH:NH_2:SO_3H = 1:2:4$) and 3 parts of calcined sodium carbonate in 100 parts of water, add to this solution 2.4 parts of a sodium hydrogen sulfite solution of $16\frac{1}{2}$ per cent. strength; this preparation applied to the hair in presence of an oxidizing agent produces a brown shade.

Example 4: Prepare the following solution from para-aminodiphenylamin-sulfonic acid obtained by the action of a sulfite on para-nitrosodiphenylamin, para-aminodiphenylamin-sulfonic acid obtained by sulfonating para-aminodiphenylamin and ortho-aminophenol-sulfonic acid ($OH:NH_2:SO_3H = 1:2:4$). Take 6 parts of each of these acids, dissolve them together in 200 parts of water with the addition of 6 parts of calcined sodium carbonate and 3 parts of a sodium hydrogen sulfite solution of about 26 per cent. strength. This preparation applied to the hair in presence of an oxidizing agent produces a black shade.

Of course the present invention is not limited to the foregoing examples nor to the details given therein.

Instead of the amino-sulfonic acids employed in the foregoing examples other acids of the aforesaid general formula may be used; in such case naturally the proportions of the ingredients may be varied within wide limits. Furthermore for the sodium carbonate used in the above examples may be substituted another suitable alkali, such as ammonium carbonate, potassium carbonate or the like. Instead of the sodium hydrogen sulfite mentioned in the foregoing examples there may be employed another salt of sulfurous acid, or the like.

Having now described my invention and in what manner the same has to be performed what I claim is,—

1. A hair dye consisting of an aqueous solution of a salt of the general formula

in which R stands for H or an aryl group, $R_1$ stands for $NH_2$ or OH, and M stands for the radical of an alkali and an alkali.

2. A hair dye consisting of an aqueous solution of a salt of the general formula

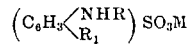

in which formula R stands for H or an aryl group, $R_1$ stands for $NH_2$ or OH, and M stands for the radical of an alkali and an alkali carbonate.

3. A hair dye consisting of an aqueous solution of sodium ortho-aminophenolsulfonate and sodium carbonate.

In witness whereof I have hereunto signed my name this 24th day of January, 1906, in the presence of two subscribing witnesses.

ERNST ERDMANN.

Witnesses:
RUDOLPH FRICKE,
SOUTHARD P. WARNER.